United States Patent [19]

Dammann et al.

[11] Patent Number: 4,798,434
[45] Date of Patent: Jan. 17, 1989

[54] OPTICAL POLARIZATION REGULATOR HAVING A WAVE-GUIDE STRUCTURE

[75] Inventors: Hans O. B. Dammann, Tangstedt; Elke B. Pross, Hamburg; Gert Rabe, Pinneberg; Wolfgang F. M. Tolksdorf, Tornesch; Manfred B. Zinke, Hamburg, all of Fed. Rep. of Germany

[73] Assignee: U.S. Philips Corp., New York, N.Y.

[21] Appl. No.: 94,574

[22] Filed: Sep. 9, 1987

[30] Foreign Application Priority Data

Sep. 10, 1986 [DE] Fed. Rep. of Germany ....... 3630741

[51] Int. Cl.$^4$ .......................... G02B 6/12; G02B 5/30; G02B 27/28
[52] U.S. Cl. .............................. 350/96.11; 350/96.12; 350/96.13; 350/96.14; 350/96.15; 350/370; 350/374; 350/375
[58] Field of Search ............ 350/370, 374, 375, 96.11, 350/96.12, 96.13, 96.14, 96.15, 96.29

[56] References Cited

U.S. PATENT DOCUMENTS

| | | | |
|---|---|---|---|
| 3,995,936 | 12/1976 | Hepner et al. | 350/96.12 |
| 4,359,260 | 11/1982 | Reinhart et al. | 350/96.12 |
| 4,529,875 | 7/1985 | Brogardh et al. | 250/227 |
| 4,707,058 | 11/1987 | Tolksdorf et al. | 350/96.12 |
| 4,712,855 | 12/1987 | Tolksdorf et al. | 350/96.12 |

FOREIGN PATENT DOCUMENTS 3600458 10/1986 Fed. Rep. of Germany .
1529374 10/1978 United Kingdom .

OTHER PUBLICATIONS

Electronics Letters, 1985, vol. 21, pp. 787–788, "New Polarisation Control Scheme for Optical Heterodyne Receiver Using Two Faraday Rotators," Okoshi et al.

*Primary Examiner*—William L. Sikes
*Assistant Examiner*—Georgia Y. Epps
*Attorney, Agent, or Firm*—William L. Botjer

[57] ABSTRACT

The invention relates to an optical polarization regulator having a wave-guide structure for converting the polarization state of an optical beam passing through and comprising devices for adjusting the coupling constants K of the TE and TM modes of the optical beam and for adjusting the difference $\Delta\beta$ of the propagation constants $\beta_{TE}$ and $\beta_{TM}$ of these modes. The wave-guide structure is a magnetooptical element (8, 9, 13). The coupling constant K is adjusted by a magnetic field acting upon the wave-guide structure (8, 9, 13) and the difference $\Delta\beta$ is adjusted by a mechanical deformation force exerted on the wave-guide structure.

18 Claims, 1 Drawing Sheet

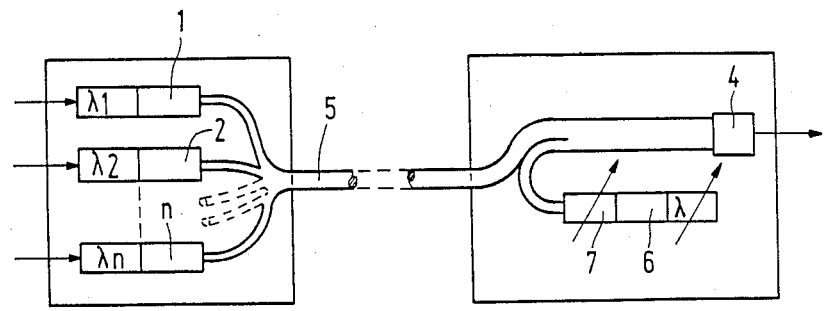
FIG. 1
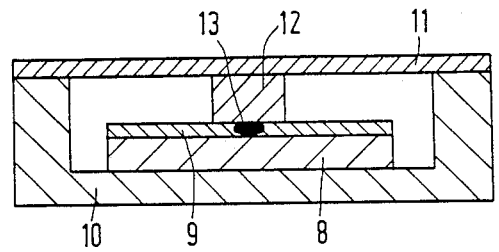
FIG. 2
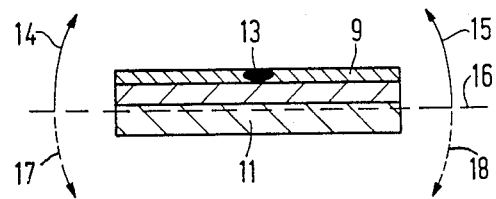
FIG. 3
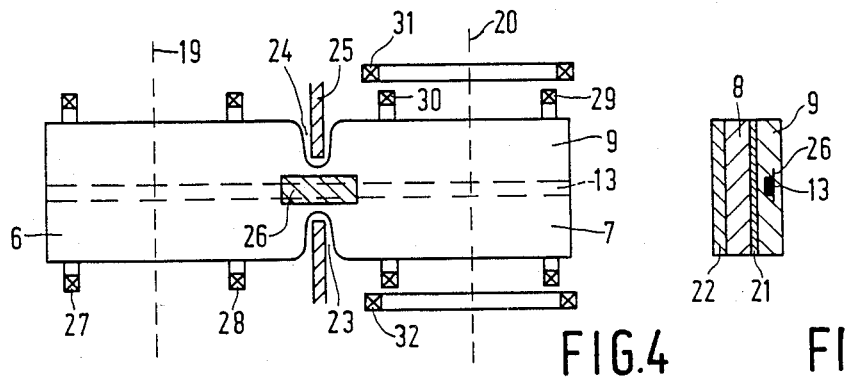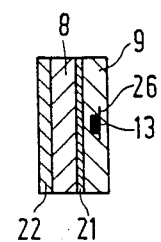
FIG. 4    FIG. 5

OPTICAL POLARIZATION REGULATOR HAVING A WAVE-GUIDE STRUCTURE

BACKGROUND OF THE INVENTION

The invention relates to an optical polarization regulator having a wave-guide structure for converting the polarization state of an optical beam passed through and comprising devices for adjusting the coupling constants K of the TE and TM modes of the optical beam and for adjusting the difference $\Delta\beta$ of the propagation constants $\beta_{TE}$ and $\beta_{TM}$ of these modes.

Such arrangements known from German Offenlegungsschrift No. 3600458 serve to specifically change the polarization state of an optical beam. More particularly, linearly polarized light can be converted into elliptically polarized light having a given polarization. Preferably, such elements in the form of strip shapes wave-guides are required for heterodyne reception in the telecommunication technique. Two optical beams, whose frequencies differ from each other by an intermediate frequency, must be superimposed with their states of polarization as equal to each other as possible. The same applies to uses in which beams of the same frequency (intermediate frequency zero) are to be superimposed. Not only is it required for the quotients of the TM and TE modes guided in orthogonal planes to be equal for both beams, but also the respective phase differences of the two modes have to be equal. In general, this can be achieved only by a regulation of the state of polarization of one of the two beams, for example of the local oscillator beam, which is to be adapted to the state of polarization varying with time of a beam incoming through an optical lead. Without readjustment, fluctuations of the intensity of the intermediate frequency signal would be obtained (compare also Electronic Letters, 1985, Vol. 21, p. 787-788).

In the known monolithic element of the kind mentioned in the opening paragraph, an electrooptical element, in which on the one hand K and on the other hand $\Delta\beta$ are individually adjustable through different electrode systems having a complicated construction and applied to an electrical voltage, serves as waveguide structure.

SUMMARY OF THE INVENTION

The invention has for its object to provide a differently constructed arrangement of the kind mentioned in the opening paragraph.

This object is achieved in that the wave-guide structure is a magnetooptical element and in that the coupling constant K is adjustable by a magnetic field acting upon the wave-guide structure and the difference $\Delta\beta$ is adjustable by a mechanical deformation force exerted on the wave guide structure.

A polarization regulator according to the invention is provided with a less complicated magnetooptical element as a stripshaped wave-guide. With this element, in a unitary body not only the regulation of K, but the regulation of $\Delta\beta$ is also possible in the manner indicated in claim 1.

Since the layer materials suitable for magnetooptical elements are also necessary for other elements of the integrated optical system, the polarization regulator according to the invention may be combined in a simple manner with other known optical elements, such as more particularly an isolator.

The pressure force required for the adjustment of the phase difference $\Delta\beta$ can be applied in different ways to the optical waveguide structure.

In normal conditions, care should be taken that the mechanical stress is uniformly distributed over the whole magnetooptical wave-guide. In order to obtain particular effects, however, it may be advantageous to cause the mechanical forces to act non-uniformly on the layer surfaces.

It is advantageous to apply not only either positive or negative pressure forces, but also to enlarge the control range by application of both positive pressure forces and negative pressure forces.

An advantageous solution in this respect is characterized in that the mechanical deformation force is produced by a bending moment exerted on the wave-guide structure.

It is also possible that the mechanical deformation force acts perpendicularly on the layer surfaces through a die.

A particularly compact solution, which permits in a simple manner of obtaining an accurate and finely stepped adjustment, is characterized in that a piezo-element is directly connected, more particularly glued, to a layer of the magnetooptical wave-guide structure.

A magnetooptical element used for the invention is preferably constructed so that further layers on the basis of pure or substituted rare earth/iron/garnet (for example with lead/bismuth/gallium) are epitaxially applied to a substrate consisting of pure or substituted gadolinium/gallium/garnet (GCG). It may be effective that absorption layers are applied to the substrate layer and/or to an upper surface layer.

The refractive indices of the upper and lower surface layers must be lower than that of the intermediate wave-guide layer.

The control of the coupling constants K can be effected in known manner (compare British Pat. No. 1529374) by application of a magnetic field, whose component acting in the direction of the optical beam is varied.

A particularly advantageous combination of a polarization regulator comprising an optical isolator required for laser light sources is obtained in that the polarization regulator is connected on a common substrate body to an optical isolator having substantially the same layer structure.

In addition, a section of the wave-guide can be constructed as polarizer between the isolator and the polarization regulator.

A mechanical decoupling of the polarization regulator from the isolator is advantageously obtained in that the combined constructional groups are decoupled by notches located between them and extending at right angles to the direction of the optical beam.

Influencing of the isolator by the magnetic field applied to the polarization regulator can be avoided by screening, which can be attained in a particularly effective manner in that the recesses are engaged by ferromagnetic screening laminations, which because of their high magnetic permeability collect stray-fields.

BRIEF DESCRIPTION OF THE DRAWINGS

In order that the invention may be readily carried out, it will now be described more fully, by way of example, with reference to the accompanying drawings, in which:

FIG. 1 shows an arrangement for selective heterodyne reception of transmitted light of different wavelengths, FIG. 2 shows diagrammatically a cross-section of a magnetooptical element according to the invention, in which the adjustable pressure force is produced by a piezo-element, FIG. 3 shows a particularly advantageous possibility of producing the desired deformation force by a bending moment, which is produced by a directly engaging piezo-element, FIG. 4 is a plan view of a monolithic unit of an optical isolator and of a polarization regulator according to the invention, FIG. 5 shows a cross-section of the arrangement of FIG. 4.

DETAILED DESCRIPTION OF THE PREFERRED EMBODIMENTS

In FIG. 1, transmitted beams having wavelengths $\lambda_1$ to $\lambda_n$ coded with message signals at the transmitter end are each time passed through optical isolators 1 to n into a common optical transmission lead 5. The isolators prevent light from being scattered back into the transmitted light sources which are usually constructed as semiconductor lasers.

At the receiver end there is superimposed on the transmitted beams a light beam of a local oscillator of a wavelength $\lambda_o$, whose frequency is adjusted to such a value that the difference frequency with the beam to be selectively received accurately corresponds to the intermediate frequency to which a receiver circuit (not shown) obtaining the electrical output signal of the photo-detector 4 is tuned.

The beam of the local oscillator is passed through the optical isolator 6 and then additionally through the polarization regulator 7. By the polarization regulator 7 the state of polarization of the local oscillator beam is adapted to the state of polarization, fluctuating with time, of the transmitted beam arriving at the receiver end.

The polarization regulator 7 comprises a magnetooptical element, which is constructed in known manner and with which devices are associated, which permit of specifically adjusting K on the one hand and $\Delta\beta$ on the other hand. The magnetooptical element is a waveguide, whose optical properties can be changed by a magnetic field and by a mechanical stress.

The coupling constant K, which practically corresponds to the specific Faraday rotation, can be adjusted in known manner by the direction of the magnetic field relative to the direction of the light propagation in the wave-guide. The amount of the magnetic field must then always have a given minimum strength in order to keep the magnetooptical material of the wave-guide in saturation. A decisive factor for the Faraday effect and hence for the coupling between the modes is only the component of the magnetic field, which is active in the direction of propagation of the light in the wave-guide. When $K_{max}$ is the maximum coupling constant and $\alpha$ is the angle between the magnetic field and the direction of propagation of the light, coupling constants K according to the relation $K_{max}\cos\alpha$ between the values $K_{max}$ and $-K_{max}$ can be adjusted.

The difference $\Delta\beta$ of the propagation constants $\beta_{TM}$ and $\beta_{TE}$ of the TM and TE modes can be adjusted according to the invention by a mechanical stress externally applied to the wave-guide of the magnetooptical element.

FIG. 2 shows diagrammatically an embodiment of a device for applying a mechanical stress. The wave-guide structure comprising the substrate 8 and the wave-guide layer 9 is disposed in a rigid housing 10. By means of the piezo-element 11, a mechanical compressive force can be applied through the die 12 more particularly to the light-conducting strip 13 extending at right angles to the plane of the drawing and embedded in the wave-guide layer. Since the stresses required for the deformation are directionally produced in the light-conducting region 13, the piezo-element 11 need produce only comparatively small forces.

By means of a bending moment, compressive or tensile stresses can be applied, as can be seen from FIG. 3, in which a preferred particularly compact construction is shown. If bending forces act upon the wave-guide structure in the direction of the arrows 14 and 15, a compressive stress is produced in the wave-guide strip 13 parallel to the layer surface, reference numeral 16 designates in a dashed line the neutral layer without stress. The compressive stress leads to expansion especially of the material of the strip 13 at right angles to the plane of the layer 9 as if in this perpendicular direction a tensile force were be exerted. With forces acting in the directions 17 and 18, on the contrary a tensile stress is produced in the strip 13, which stress leads to a compression of the strip 13 at right angles to the plane of the layer 9. Due to change of the mechanical stress from a positive maximum to a negative maximum, $\Delta\beta$ can be varied in a wide range. This is effected by the piezo-element 11 of known construction, which can be bended so as to become concave or convex by voltages applied to its electrodes.

Wave-guide structures particularly suitable for the invention are epitaxial layer bodies. First a lower highly absorbing layer of Co-YIG having a thickness of about 3 $\mu$m is applied to a GCG substrate layer 8 having a thickness of about 0.5 $\mu$m. On this layer is disposed a lower surface layer of more particularly lead-substituted yttrium-iron-garnet (YIG) having a thickness of about 4 $\mu$m. The about 6 $\mu$m thick wave-guide layer 13 of pure or substituted YIG is embedded between this layer and an upper surface layer equal to the lower surface layer. The refractive indices of the surface layers 9 are slightly lower than the refractive index of the wave-guide layer 13.

A further highly absorbing layer can be disposed on the upper surface layer, in which event the lower absorbing layer may be dispensed with.

In the arrangement shown diagrammatically in FIG. 4, the isolator 6 and the polarization regulator 7 are constructed as parts of a commonly manufactured magnetooptical element. A cross-section at the areas of the dashed lines 19 or 20 is shown in FIG. 5, in which in addition to the layer sequence shown in FIG. 3 an absorption layer 21 and a bending device 22 (shown only diagrammatically) having a piezo-element can be seen.

For the isolator 6 and the polarization regulator 7, mutually independent bending devices 22 are to be provided, which each act only upon the constructional group associated with them. In order to obtain a more satisfactory mechanical decoupling of the constructional groups, recesses 23 and 24 are formed between them, are engaged by ferromagnetic screening laminations 25, which should prevent stray lines of the magnetic field acting upon the polarization regulator 7 from applying to the isolator 6.

At the area of reduced width, the wave-guide layer 13 is provided with a metallic covering layer 26, as a result of which the effect of a polarizer is obtained there.

The ring coils 27 and 28 have to indicate the production of a magnetic field in the direction of propagation of the light, by which the material is magnetically saturated. This magnetic field may also be produced by a permanent magnet. With the use of coils, a fine adjustment of the Faraday effect can be obtained by control of the current.

By means of the effect of force of the piezo-device 22 associated with the isolator, a value $\Delta\beta=0$ can be maintained for the isolator (phase matching).

By means of the piezo device 22 associated with the polarization regulator 7, on the contrary, an arbitrary value $\beta$ is dadjustable in this range within certain limits (phase tuning).

The coupling constant K of the polarization regulator 7 is adjusted to the required value by an electrically produced magnetic field. The ring coils 29 and 30 aligned coaxially to the layer body produce a field component in the direction of the wave guide layer 13, while the lateral ring coils 31 and 32 produce a component at right angles thereto in the direction of the plane of the layer. The coupling constant K depends upon the angle of the resulting field direction formed from these two field components with the direction of the wave-guide layer 13.

What is claimed is:

1. An optical polarization regulator having a waveguide structure for converting the state of polarization of an optical beam passing through and comprising devices for adjusting the coupling constants K of the TE and TM modes of the optical beam and for adjusting the difference $\Delta\beta$ of the propagation constants $\beta_{TE}$ and $\beta_{TM}$ of these modes, characterized in that the waveguide structure is a layered magnetooptical element, and in that the coupling constant (K) is adjustable by a magnetic field acting upon the wave-guide structure and the difference ($\Delta\beta$) is adjustable by a mechanical deformation force exerted on the wave-guide structure.

2. A polarization regulator as claimed in claim 1, characterized in that the mechanical deformation force is produced by a bending moment applied to the waveguide structure.

3. A polarization regulator as claimed in claim 1, characterized in that the mechanical deformation force acts perpendicularly on the layers through a die.

4. A polarization regulator as claimed in claim 2, characterized in that a piezo-element is directly glued to a layer of the magnetooptical wave-guide structure.

5. A polarization regulator as claimed in claim 1, characterized in that the wave-guide has a pure or substituted substrate on the basis of more particularly gadolinium-gallium-garnet, to which further layers on the basis of pure or (for example lead-, bismuth-, gallium-) substituted rare earth/iron/garnet are epitaxially applied.

6. A polarization regulator as claimed in claim 5, characterized in that absorption layers are applied to the substrate layer and/or to an upper surface layer.

7. A polarization regulator as claimed in claim 1, characterized in that it is connected on a common substrate body to an optical isolator having substantially the same layer structure.

8. A polarization regulator as claimed in claim 7, characterized in that a polarizer is integrated between the isolator and the polarization regulator.

9. A polarization regulator as claimed in claim 7, characterized in that the polarization regulator and optical isolator are decoupled by notches located between them and extending at right angles to the direction of the optical beam.

10. A polarization regulator as claimed in claim 9, characterized in that by highly permeable screening laminations are disposed within said notches.

11. An optical polarization regulator for converting the state of polarization of an optical beam passing therethrough and for adjusting the coupling constants K of the TE and TM modes of the optical beam and for adjusting the difference $\Delta\beta$ of the propagation constants $\beta_{TE}$ and $\beta_{TM}$ of these modes comprising:
   a substrate;
   a magnetooptical waveguide layer disposed in said substrate, said magnetooptical waveguide layer having a light conducting strip disposed within and a coupling constant (K) that is adjustable by a magnetic field and a propagation constant difference $\Delta\beta$ adjustable by mechanical deformation; and;
   means for exerting a mechanical deformation on said waveguide layer to thereby adjust $\Delta\beta$.

12. The polarization regulator as claimed in claim 11 wherein said means for exerting a mechanical deformation on said waveguide layer comprises a piezoelectric element.

13. The polarization regulator as claimed in claim 12 wherein said piezoelectric element acts on said waveguide structure through a die disposed therebetween.

14. The polarization regulator as claimed in claim 12 wherein said piezoelectric element is directly connected to said waveguide structure.

15. The polarization regulator as claimed in claim 11 further including absorption layers applied to at least one of the substrate and the waveguide layer.

16. The polarization regulator as claimed in claim 1 wherein said regulator is disposed on a common substrate with an optical isolator, said optical isolator having substantially the same structure as said polarization regulator.

17. The polarization regulator as claimed in claim 16 wherein said substrate includes notches disposed between said optical isolator and said polarization regulator and extending at right angles to the direction of the optical beam to decouple the polarization regulator from the optical isolator.

18. The polarization regulator as claimed in claim 17 further including magnetically permeable screening laminations disposed within said decoupling notches.

* * * * *